UNITED STATES PATENT OFFICE.

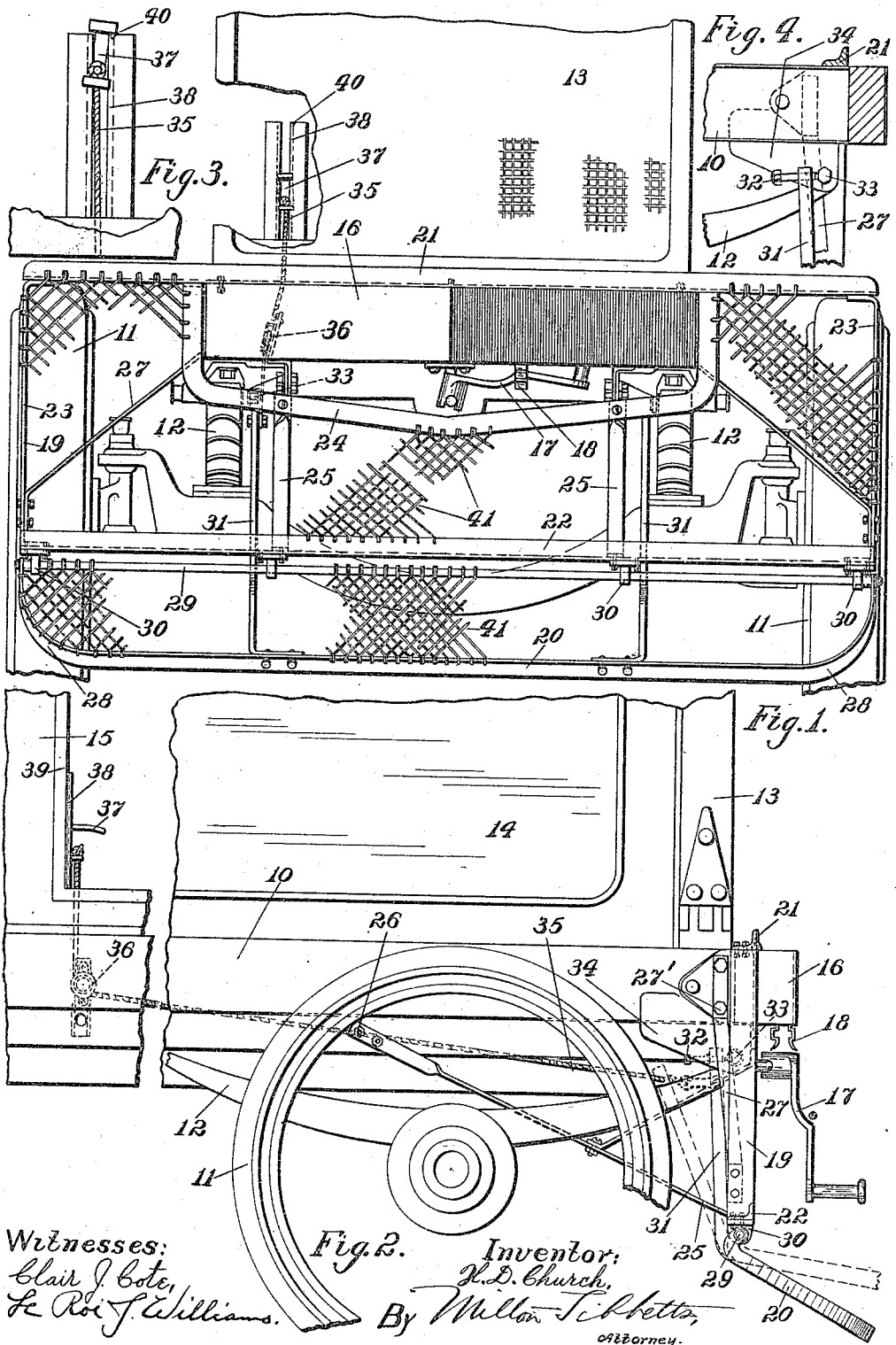

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,183,167.      Specification of Letters Patent.      Patented May 16, 1916.

Application filed November 21, 1913. Serial No. 802,265.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles and particularly to the fenders thereof.

One of the objects of the invention is to provide a motor vehicle with a fender of simple and inexpensive construction, one that will be effective in operation, one that is rigidly secured to the vehicle, and one that may be adjusted to vary the road clearance.

Other objects of the invention will appear from the following description taken in connection with the drawings which form a part of this specification and in which:—

Figure 1 is a front elevation of a motor vehicle embodying this invention; Fig. 2 is a side elevation of the vehicle shown in Fig. 1; Fig. 3 is an enlarged view of a detail showing the fender control device in a different position than that shown in Fig. 1; and Fig. 4 is a longitudinal section through the front part of a vehicle illustrating a detail.

Referring to the drawings, 10 represents the vehicle frame which is supported at its front end upon the front wheels 11 through springs 12. The radiator 13 is suitably mounted on the forward end of the frame and the motor is housed under the bonnet 14 which extends from the radiator rearwardly to the dash. In Fig. 2 of the drawings, a part of the vehicle is cut away to bring forward the driver's seat 15, in order to illustrate the control device for the fender hereinafter described.

The front end of the frame 10 is in the form of a transverse member or bumper 16 which is usually of heavy wood construction to protect the frame and vehicle from collision. The starting crank 17 of the motor is usually mounted directly beneath this bumper and in its operative position, projects beyond it in convenient position for the operator. Usually also this starting crank is adapted to be folded out of the way and held as by the spring clamp 18 beneath the bumper.

The vehicle fender is shown as formed of an upright portion 19 and a forwardly projecting portion 20, the upright portion having a top bar 21 extending across the top of the front end of the vehicle frame and supporting the fender thereon. The framework of this portion is completed by a bottom member 22 arranged parallel with the top bar 21, side members 23, and a U-shaped member 24 secured to the top member 21 and extending at both sides of and beneath the bumper 16. It will be seen that this portion 19 of the fender projects downwardly and outwardly at both sides of the bumper 16 or forward end of the vehicle frame, and in order to rigidly secure it in position, it is provided with diagonally extending braces 25 from the bottom member 22 to points 26 on the frame remote from the front end. Diagonal brace rods 27 also extend from the lower outer corners of this portion 19 to the frame at 27'.

It will be seen that the U-shaped member 24 leaves sufficient space between it and the lower side of the bumper or frame front end to permit the starting crank 17 to extend therethrough forwardly of the bumper and be in an accessible position for the operator.

The portion 20 of the vehicle fender is preferably of substantially rectangular form with rounded corners 28, and its rearward frame member 29 is pivoted to the lower edge of the fender portion 19 as by brackets 30. The portion 20 is also provided with one or more arms 31 which extend upwardly from the rear end of this portion to a point adjacent the front end of the springs 12. In the form shown there are two of these arms 31 and each of them is provided with a set screw 32 which is adapted to rest against a suitable abutment 33 secured to the frame 10, when the portion 20 of the fender is in its normal position. As shown the abutment 33 is a continuation of the head of the front spring bolt which is mounted in a bracket 34 secured to the front end of the frame 10.

It will be seen that the normal operative position of the projecting portion 20 of the fender may be varied to comply with variations in the laws of different cities or communities by simply adjusting the screw 32. As some of these ordinances require the fenders to be very low or with very little road clearance, it is necessary to make some provision for temporarily raising the fender to avoid obstructions as when the vehicle is traveling over rough paving or roads.

In the present invention, the projecting portion 20 of the fender may be raised as shown in dotted lines in Fig. 2 by means of a cable 35 or other suitable device connected to one of the arms 31. As shown, this cable extends rearwardly to a pulley 36 and thence upwardly immediately in front of the seat 15. The end of the cable 35 may be secured to a handle 37 sliding in ways 38 on the front side of the heel board 39, this handle 37 being in a convenient position for operation by the driver and adapted to be secured in its upper position by a lateral movement so that it catches in the notch 40 at the top of the ways 38. Figs. 1 and 2 show the projecting portion of the fender in its normal operative position, and Fig. 3 and the dotted lines in Fig. 2 show the fender in its raised position.

It will be understood that suitable lacing 41 is provided in both of the fender portions as shown in the drawings.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:—

1. In a motor vehicle, the combination with the vehicle frame, of a fender suspended from the frame and having a bar extending across and resting upon the front end of the frame, and braces from the frame to the fender.

2. In a motor vehicle, the combination with the vehicle frame, of a fender suspended from the frame and extending beyond both sides thereof, braces extending from the lower outer corners of the fender to the front end of the frame, and braces from the lower part of the fender to points on the frame remote from the front end.

3. In a motor vehicle, the combination with the vehicle frame and a motor starting crank beneath and adapted to extend beyond the front end of the frame, of a fender having a part extending substantially vertically beneath and at both sides of the front end of the frame leaving a space between the frame and said fender, said starting crank being adapted to extend through said space, and means for supporting said fender in position.

4. In a motor vehicle, the combination with the vehicle frame and a motor starting crank beneath and adapted to extend beyond the front end of the frame, of a fender having a substantially vertical portion comprising a top bar extending across the front end of the frame and supporting the fender thereon, side and bottom bars completing the substantially rectangular framework of said vertical portion, a U-shaped member suspended from the top member and extending downwardly at both sides of and beneath the vehicle frame and starting crank, and lacing between said U-shaped member and the other parts of the fender framework.

5. In a motor vehicle, the combination with the vehicle frame arranged between the front wheels and extending forwardly thereof, of a substantially vertical fender supported from the frame and extending below and at both sides of the frame in front of the wheels, said fender providing an opening through which the frame extends.

6. In a motor vehicle, the combination with the vehicle frame arranged between the front wheels and having a bumper portion extending forwardly thereof, of a fender supported from the frame and extending below and at both sides of said bumper portion in front of the wheels, said fender providing an opening through which said bumper portion projects.

7. In a motor vehicle, the combination with the vehicle frame, of a fender supported thereon, and comprising a stationary upright portion and a forwardly projecting pivoted portion, means for swinging said pivoted portion on its pivots to raise it, and adjustable means at the front end of the vehicle frame to limit the lowered position of said portion.

8. In a motor vehicle, the combination with the vehicle frame, of a fender supported thereon and comprising a stationary upright portion and a forwardly projecting pivoted portion, said pivoted portion having arms adapted to coöperate with a part of the frame to limit the lowered position of said portion, and adjustable means at the front end of the vehicle frame for altering the normal lowered position of said portion.

9. In a motor vehicle, the combination with the vehicle frame, of a fender supported thereon and comprising a stationary upright portion and a forwardly projecting portion pivoted to the upright portion, means remote from the driver's seat of the vehicle for adjusting the projecting portion within limits to any desired normal height, and means within reach of the operator of the vehicle for raising the projecting portion to avoid obstructions.

In testimony whereof I affix my signature in the presence of two witnesses.

HAROLD D. CHURCH.

Witnesses:
E. B. KNAP,
LE ROI J. WILLIAMS.

Copies of this patent may be obtained for five cents each, by addressing the "Commissioner of Patents, Washington, D. C."